US008396293B1

United States Patent
Korah et al.

(10) Patent No.: US 8,396,293 B1
(45) Date of Patent: Mar. 12, 2013

(54) RECOGNIZING GEOMETRICALLY SALIENT OBJECTS FROM SEGMENTED POINT CLOUDS USING STRIP GRID HISTOGRAMS

(75) Inventors: Thommen Korah, Marina Del Rey, CA (US); Swarup S. Medasani, Thousand Oaks, CA (US); Yuri Owechko, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 594 days.

(21) Appl. No.: 12/644,751

(22) Filed: Dec. 22, 2009

Related U.S. Application Data

(63) Continuation-in-part of application No. 12/644,349, filed on Dec. 22, 2009.

(51) Int. Cl.
*G06K 9/00* (2006.01)
(52) U.S. Cl. ........................ 382/171; 382/170
(58) Field of Classification Search ........... 382/168–171
See application file for complete search history.

(56) References Cited

U.S. PATENT DOCUMENTS

| | | | |
|---|---|---|---|
| 2007/0201743 A1* | 8/2007 | Ferman | 382/168 |
| 2008/0018941 A1* | 1/2008 | Taylor | 358/3.27 |
| 2009/0190827 A1* | 7/2009 | Saito | 382/154 |

OTHER PUBLICATIONS

Himmelsbach et al: "Real-time Object Classification in 3D Point Clouds Using Point Feature Histograms", International Conference on Intelligent Robots and Systems, IEEE, Oct. 11-15, 2009.
Anguelov et al: "Discriminative Learning of Markov Random Fields for Segmentation of 3D Scan Data", IEEE, 2005, pp. 994-1000.
U.S. Appl. No. 12/644,349, filed Dec. 22, 2009, Korah.

* cited by examiner

*Primary Examiner* — Jingge Wu
(74) *Attorney, Agent, or Firm* — Ladas & Parry

(57) ABSTRACT

A method of recognizing geometrically salient objects from sensed data points collected in a 3D environment includes using a sensor that collects a plurality of sensed data points each having spatial coordinate information in three dimensions x, y and z, populating a strip histogram grid having a plurality of strips, each strip having a z, dx and dy dimensions, wherein dx is a portion of an x dimension and dy is a portion of a y dimension of the strip histogram grid, by assigning each sensed data point to a strip that has x, y and z dimensions that encompass the spatial coordinate information of the respective assigned sensed data point, and segmenting the strip histogram grid into a plurality of segmented regions, each segmented region comprising one strip or a group of neighboring strips having similar attributes.

24 Claims, 23 Drawing Sheets

SENSING THE 3D ENVIRONMENT USING A SENSOR THAT COLLECTS A PLURALITY OF SENSED DATA POINTS FROM THE 3D ENVIRONMENT, EACH SENSED DATA POINT HAVING SPATIAL COORDINATE INFORMATION IN THREE DIMENSIONS X, Y AND Z — 200

POPULATING A STRIP HISTOGRAM GRID HAVING A PLURALITY OF STRIPS, EACH STRIP HAVING A DX DIMENSION AND A DY DIMENSION, WHEREIN DX IS A PORTION OF AN X DIMENSION OF THE STRIP HISTOGRAM GRID AND DY IS A PORTION OF A Y DIMENSION OF THE STRIP HISTOGRAM GRID, BY ASSIGNING EACH SENSED DATA POINT TO A STRIP IN THE STRIP HISTOGRAM GRID THAT HAS X, Y AND Z DIMENSIONS THAT ENCOMPASS THE SPATIAL COORDINATE INFORMATION OF THE RESPECTIVE ASSIGNED SENSED DATA POINT — 202

ESTIMATING THE LOCAL GROUND PLANE FOR A STRIP IN THE STRIP HISTOGRAM GRID BY USING INFORMATION ON EACH SENSED DATA POINT ASSIGNED TO THAT STRIP AND SURROUNDING STRIPS IN THE STRIP HISTOGRAM GRID — 204

FIG. 5A

DIVIDING EACH STRIP INTO A PLURALITY OF CELLS, EACH CELL HAVING A DIMENSION OF DX, DY, AND DZ — 206

INITIALIZING A GROUND SUPPORT VARIABLE FOR EACH CELL OF THE PLURALITY OF CELLS TO ZERO — 208

INCREMENTING A GROUND SUPPORT VARIABLE ASSOCIATED WITH A RESPECTIVE CELL BY 1 EACH TIME A SENSED DATA POINT IS ASSIGNED TO THAT RESPECTIVE CELL OR A SENSED DATA POINT IS ASSIGNED TO A CELL IN A SURROUNDING STRIP HAVING A SAME Z DIMENSION AS THE RESPECTIVE CELL AND BEING WITHIN A SET DISTANCE OF THE RESPECTIVE CELL — 210

ESTIMATING THE LOCAL GROUND PLANE FOR THE RESPECTIVE STRIP AS BEING THE LOWEST Z LEVEL CORRESPONDING TO A CELL WITHIN THE RESPECTIVE STRIP WITH A RESPECTIVE GROUND SUPPORT VARIABLE GREATER THAN A THRESHOLD — 212

FIG. 5B

COMPUTING PARTIAL DERIVATIVES OF STRIP HEIGHT $S^H$, WHEREIN STRIP HEIGHT IS A MAXIMUM Z DIMENSION $S^{MAX}$ FOR AN ASSIGNED SENSED DATA POINT IN A RESPECTIVE STRIP, ALONG X AND Y AXES FOR STRIPS IN A 3 X 3 STRIP NEIGHBORHOOD OF THE RESPECTIVE STRIP — 220

ESTIMATING A LOCAL HEIGHT GRADIENT $S^{ZSLOPE}$ FOR THE RESPECTIVE STRIP FROM THE PARTIAL DERIVATIVES — 222

LABELING THE RESPECTIVE STRIP AS SMOOTH $S^{SM}$ = TRUE IF A RANGE IN LOCAL HEIGHT GRADIENT $S^{ZSLOPE}$ FOR THE STRIPS WITHIN THE 3 X 3 STRIP NEIGHBORHOOD OF THE RESPECTIVE STRIP IS LESS THAN A THRESHOLD $T_Z$ — 224

FIG. 6A

USING A PREDICATE $P_{SM}$ TO EXTRACT OUT SMOOTH SURFACES WHEREIN THE PREDICATE COMPRISES SATISFYING A FIRST CONDITION OR A SECOND CONDITION     226

WHEREIN THE FIRST CONDITION IS TRUE IF TWO NEIGHBORING STRIPS ARE LABELED AS $S^{SM}$ = TRUE AND A DIFFERENCE IN A HEIGHT OF EACH OF THE NEIGHBORING STRIPS IS LESS THAN A FIRST THRESHOLD $T_{z1}$

228

WHEREIN THE SECOND CONDITION IS TRUE IF ONE OF THE TWO NEIGHBORING STRIPS ARE LABELED AS $S^{SM}$ =     230 TRUE AND A DIFFERENCE IN A LOCAL HEIGHT GRADIENT $S^{zslope}$ OF THE NEIGHBORING STRIPS IS LESS THAN A SECOND THRESHOLD $T_{z2}$

FIG. 6B

CALCULATING AN IMAGE $G_M$ OF DIMENSIONS $N_X \times N_Y$, WHEREIN THE IMAGE CONTAINS A MINIMUM HEIGHT $S^{ZMIN}$ FROM THE LOCAL GROUND PLANE OF ALL SENSED DATA POINTS IN A RESPECTIVE STRIP — 240

FORMING AN IMAGE COMPRISING STRIP HEIGHT $S^H$ FOR EACH RESPECTIVE STRIP LABELED AS $S^{SM}$ = TRUE — 242

FORMING A PROVISIONAL MAP $B_{PM} = MAX(G_M, S_M)$ BY COMPARING $S^{ZMIN}$ FROM $G_M$ AND $S^H$ FROM $S_M$ AND SETTING $S^{BM}$ OF EACH RESPECTIVE STRIP IN THE PROVISIONAL MAP TO THE MAXIMUM OF $S^{ZMIN}$ AND $S^H$ — 244

FIG. 7A

USING A PREDICATE $P_{BLD}$ TO PERFORM BUILDING SEGMENTATION WHEREIN THE PREDICATE COMPRISES SATISFYING A FIRST BUILDING SEGMENTATION CONDITION OR A SECOND BUILDING SEGMENTATION CONDITION — 246

WHEREIN THE FIRST BUILDING SEGMENTATION CONDITION IS TRUE IF TWO NEIGHBORING STRIPS ARE LABELED AS $S^{SM}$ = TRUE AND A RATIO OF $S^H$ HEIGHTS BETWEEN THE NEIGHBORING STRIPS IS LESS THAN OR EQUAL TO A FIRST THRESHOLD $T_{R1}$

248

WHEREIN THE SECOND BUILDING SEGMENTATION CONDITION IS TRUE IF AN ABSOLUTE DIFFERENCE IN $S^{BM}$ IS LESS THAN A SECOND THRESHOLD $T_{R2}$ AND THE RATIO OF HEIGHTS BETWEEN THE NEIGHBORING STRIPS IS LESS THAN OR EQUAL TO A THIRD THRESHOLD $T_{R3}$  250

FIG. 7B

USING A PREDICATE $P_{TD}$ TO PERFORM TOP DOWN SEGMENTATION WHEREIN THE PREDICATE COMPRISES SATISFYING A FIRST TOP DOWN SEGMENTATION CONDITION, A SECOND TOP DOWN SEGMENTATION CONDITION, AND A THIRD TOP DOWN SEGMENTATION CONDITION — 260

WHEREIN THE FIRST TOP DOWN CONDITION IS TRUE IF PBLD ($S_I$, $S_J$) IS NOT TRUE — 262

WHEREIN THE SECOND TOP DOWN CONDITION IS TRUE IF EACH OF TWO NEIGHBORING STRIPS HAVE A BOOLEAN FLAG $S^{POP}$ SET TO TRUE DESIGNATING THAT THE RESPECTIVE STRIP IS POPULATED ABOVE THE LOCAL GROUND PLANE FOR THE RESPECTIVE STRIP — 264

WHEREIN THE THIRD TOP DOWN SEGMENTATION CONDITION IS TRUE IF THE RATIO OF HEIGHTS BETWEEN THE NEIGHBORING STRIPS IS LESS THAN OR EQUAL TO A THRESHOLD $T_{TD1}$ — 266

FIG. 8

USING A PREDICATE $P_{BUP}$ TO PERFORM BOTTOM UP SEGMENTATION WHEREIN THE PREDICATE COMPRISES SATISFYING A FIRST TOP DOWN SEGMENTATION CONDITION, A SECOND TOP DOWN SEGMENTATION CONDITION, AND A THIRD TOP DOWN SEGMENTATION CONDITION — 270

WHEREIN THE FIRST BOTTOM UP CONDITION IS TRUE IF PBLD ($S_I$, $S_J$) IS NOT TRUE — 272

WHEREIN THE SECOND BOTTOM UP CONDITION IS TRUE IF EACH OF TWO NEIGHBORING STRIPS HAVE A BOOLEAN FLAG $S^{POP}$ SET TO TRUE DESIGNATING THAT THE RESPECTIVE STRIP IS POPULATED ABOVE THE LOCAL GROUND PLANE FOR THE RESPECTIVE STRIP — 274

WHEREIN THE THIRD BOTTOM UP SEGMENTATION CONDITION IS TRUE IF THE RATIO OF BOTTOM UP HEIGHTS BETWEEN THE NEIGHBORING STRIPS IS LESS THAN A THRESHOLD $T_{BUP1}$ — 276

FIG. 9

SENSING THE 3D ENVIRONMENT USING A SENSOR THAT
COLLECTS A PLURALITY OF SENSED DATA POINTS FROM
THE 3D ENVIRONMENT, EACH SENSED DATA POINT
HAVING SPATIAL COORDINATE INFORMATION IN THREE
DIMENSIONS X, Y AND Z — 300

POPULATING A STRIP HISTOGRAM GRID HAVING A
PLURALITY OF STRIPS, EACH STRIP HAVING A Z, AN
DX DIMENSION AND A DY DIMENSION, WHEREIN DX IS A
PORTION OF AN X DIMENSION OF THE STRIP HISTOGRAM
GRID AND DY IS A PORTION OF A Y DIMENSION OF THE
STRIP HISTOGRAM GRID, BY ASSIGNING EACH SENSED
DATA POINT TO A STRIP IN THE STRIP HISTOGRAM
GRID THAT HAS X, Y AND Z DIMENSIONS THAT
ENCOMPASS THE SPATIAL COORDINATE INFORMATION OF
THE RESPECTIVE ASSIGNED SENSED DATA POINT — 302

SEGMENTING THE STRIP HISTOGRAM GRID INTO A
PLURALITY OF SEGMENTED REGIONS, EACH SEGMENTED
REGION COMPRISING ONE STRIP OR A GROUP OF
NEIGHBORING STRIPS HAVING SIMILAR ATTRIBUTES — 304

FIG. 11

| LABELING A SEGMENTED REGION AS WOODS OR A FORESTED REGION IF A RESPECTIVE SEGMENTED REGION HAS A SEGMENTED REGION HEIGHT GREATER THAN A HEIGHT THRESHOLD, A SEGMENTED REGION AREA GREATER THAN AN AREA THRESHOLD, AND THE SEGMENTED REGION HAS NO STRIP WITHIN THE SEGMENTED REGION HAVING THE $S^{SM}$ SMOOTHNESS PROPERTY | 306 |

| COMPUTING PARTIAL DERIVATIVES OF STRIP HEIGHT $S^H$, WHEREIN STRIP HEIGHT IS A MAXIMUM Z DIMENSION $S^{MAX}$ FOR AN ASSIGNED SENSED DATA POINT IN A RESPECTIVE STRIP, ALONG X AND Y AXES FOR STRIPS IN A 3 X 3 STRIP NEIGHBORHOOD OF THE RESPECTIVE STRIP | 308 |

| ESTIMATING A LOCAL HEIGHT GRADIENT $S^{ZSLOPE}$ FOR THE RESPECTIVE STRIP FROM THE PARTIAL DERIVATIVES | 310 |

| LABELING THE RESPECTIVE STRIP AS SMOOTH $S^{SM}$ = TRUE IF A RANGE IN LOCAL HEIGHT GRADIENT $S^{ZSLOPE}$ FOR THE STRIPS WITHIN THE 3 X 3 STRIP NEIGHBORHOOD OF THE RESPECTIVE STRIP IS LESS THAN A THRESHOLD $T_Z$ | 312 |

FIG. 12

LABELING A SEGMENTED REGION AS MERGED CARS IF A
RESPECTIVE SEGMENTED REGION HAS A SEGMENTED       314
REGION HEIGHT LESS THAN A HEIGHT THRESHOLD, A
SEGMENTED REGION MOMENT WIDTH GREATER OR EQUAL
TO A FIRST WIDTH THRESHOLD AND LESS THAN OR
EQUAL TO A SECOND WIDTH THRESHOLD, A SEGMENTED
REGION MOMENT LENGTH GREATER THAN A LENGTH
THRESHOLD, AND A SEGMENTED REGION AREA DIVIDED
BY THE SEGMENTED REGION MOMENT LENGTH TIMES THE
SEGMENTED REGION MOMENT WIDTH GREATER THAN A
RATIO THRESHOLD

FIG. 13

PERFORMING BOTTOM UP SEGMENTATION TO FORM
SEGMENTED REGIONS $R_{BUP}$ HAVING POPULATED STRIPS     320
PROJECTING UP FROM A LOCAL GROUND PLANE ESTIMATE

DETERMINING FOR EACH STRIP A LONGEST ARRAY OF     322
CONSECUTIVELY POPULATED CELLS FROM THE LOCAL
GROUND PLANE ESTIMATE FOR THE STRIP TO COMPUTE A
BOTTOM-UP HEIGHT, WHEREIN EACH STRIP IS DIVIDED
INTO A PLURALITY OF CELLS, EACH CELL HAVING A
DIMENSION OF DX, DY, AND DZ

LABELING A $R_{BUP}$ SEGMENTED REGION AS A POLE IF THE
RESPECTIVE $R_{BUP}$ SEGMENTED REGION CONTAINS NO MORE
THAN A THRESHOLD NUMBER OF STRIPS AND THE
BOTTOM-UP HEIGHT FOR A STRIP IN THE RESPECTIVE
$R_{BUP}$ SEGMENTED REGION IS GREATER THAN A HEIGHT     324
THRESHOLD

FIG. 14

LABELING A SEGMENTED REGION AS A CONSTRUCTION
CRANE IF THE RESPECTIVE SEGMENTED REGION
CONTAINS AT LEAST ONE STRIP HAVING A HEIGHT
ABOVE A GROUND PLANE ESTIMATE FOR THE STRIP
GREATER THAN A HEIGHT THRESHOLD, AN AREA FOR THE
RESPECTIVE SEGMENTED REGION IS GREATER THAN AN
AREA THRESHOLD, THE RESPECTIVE SEGMENTED REGION
HAS NOT BEEN IDENTIFIED AS A BUILDING, AND NO
ADJACENT STRIP $S_I$ TO THE RESPECTIVE SEGMENTED
REGION BELONGS TO A BUILDING.

| 330 | SENSING THE 3D ENVIRONMENT USING A SENSOR THAT COLLECTS A PLURALITY OF SENSED DATA POINTS FROM THE 3D ENVIRONMENT, EACH SENSED DATA POINT HAVING SPATIAL COORDINATE INFORMATION IN THREE DIMENSIONS X, Y AND Z |

| 332 | POPULATING A STRIP HISTOGRAM GRID HAVING A PLURALITY OF STRIPS, EACH STRIP HAVING A Z, AN DX DIMENSION AND A DY DIMENSION, WHEREIN DX IS A PORTION OF AN X DIMENSION OF THE STRIP HISTOGRAM GRID AND DY IS A PORTION OF A Y DIMENSION OF THE STRIP HISTOGRAM GRID, BY ASSIGNING EACH SENSED DATA POINT TO A STRIP IN THE STRIP HISTOGRAM GRID THAT HAS X, Y AND Z DIMENSIONS THAT ENCOMPASS THE SPATIAL COORDINATE INFORMATION OF THE RESPECTIVE ASSIGNED SENSED DATA POINT |

| 334 | DETERMINING A HEIGHT = MAXIMUM Z FOR EACH STRIP IN THE STRIP HISTOGRAM GRID AND STORING THE HEIGHT FOR EACH STRIP IN COMPUTER READABLE MEMORY |

| 336 | MARKING A RESPECTIVE STRIP IN THE STRIP HISTOGRAM GRID AS A POTENTIAL POWER LINE STRIP IF THERE ARE A THRESHOLD NUMBER OF UNPOPULATED CELLS BELOW THE HEIGHT FOR THE RESPECTIVE STRIP AND THE HEIGHT FOR THE RESPECTIVE STRIP IS GREATER THAN A HEIGHT THRESHOLD |

| 338 | WHEREIN EACH STRIP IS DIVIDED INTO A PLURALITY OF CELLS, EACH CELL HAVING A DIMENSION OF DX, DY, AND DZ |

FIG. 16A

FORMING A 3D IMAGE HAVING TOKEN STRIPS HAVING A RESOLUTION OF DX, DY EQUAL TO STRIPS IN THE STRIP HISTOGRAM GRID IN THE X AND Y DIMENSIONS, AND TOKEN STRIP HEIGHTS IN THE Z DIMENSION SET EQUAL TO THE HEIGHT FOR EACH RESPECTIVE STRIP IN THE STRIP HISTOGRAM GRID MARKED AS A POTENTIAL POWER LINE     340

IDENTIFYING LINES OF TOKEN STRIPS HAVING HEIGHT GREATER THAN ZERO IN THE 3D IMAGE     342

REMOVING FROM THE 3D IMAGE ANY LINES OF TOKEN STRIPS HAVING A LENGTH LESS THAN A LENGTH THRESHOLD     344

LABELING ANY STRIP IN THE STRIP HISTOGRAM GRID THAT CORRESPONDS TO A TOKEN STRIP IN THE 3D IMAGE AS A POWER LINE STRIP.     346

FIG. 16B

SENSING THE 3D ENVIRONMENT USING A SENSOR THAT COLLECTS A PLURALITY OF SENSED DATA POINTS FROM THE 3D ENVIRONMENT, EACH SENSED DATA POINT HAVING SPATIAL COORDINATE INFORMATION IN THREE DIMENSIONS X, Y AND Z — 350

POPULATING A STRIP HISTOGRAM GRID HAVING A PLURALITY OF STRIPS, EACH STRIP HAVING A Z, AN DX DIMENSION AND A DY DIMENSION, WHEREIN DX IS A PORTION OF AN X DIMENSION OF THE STRIP HISTOGRAM GRID AND DY IS A PORTION OF A Y DIMENSION OF THE STRIP HISTOGRAM GRID, BY ASSIGNING EACH SENSED DATA POINT TO A STRIP IN THE STRIP HISTOGRAM GRID THAT HAS X, Y AND Z DIMENSIONS THAT ENCOMPASS THE SPATIAL COORDINATE INFORMATION OF THE RESPECTIVE ASSIGNED SENSED DATA POINT — 352

DETERMINING FOR EACH STRIP A LONGEST ARRAY OF CONSECUTIVELY POPULATED CELLS FROM A LOCAL GROUND PLANE ESTIMATE FOR THE STRIP TO COMPUTE A BOTTOM-UP HEIGHT , WHEREIN EACH STRIP IS DIVIDED INTO A PLURALITY OF CELLS, EACH CELL HAVING A DIMENSION OF DX, DY, AND DZ — 354

FIG. 17A

LABELING A RESPECTIVE STRIP AS A POTENTIAL POST
IF THE BOTTOM-UP HEIGHT FOR THE RESPECTIVE STRIP   356
IS LESS THAN OR EQUAL TO A HEIGHT THRESHOLD, THE
CELLS FOR THE RESPECTIVE STRIP ARE UNPOPULATED
FOR A DISTANCE THRESHOLD ABOVE THE BOTTOM-UP
HEIGHT , AND THE CELLS UP TO THE BOTTOM-UP
HEIGHT FOR THE RESPECTIVE STRIP ARE POPULATED
WITH AT LEAST A POPULATION THRESHOLD NUMBER OF
SENSED DATA POINTS

MERGING ADJACENT POTENTIAL POST STRIPS INTO A   358
SEGMENTED POST REGION IF THE ADJACENT POTENTIAL
POST STRIPS IS LESS THAN A MERGE THRESHOLD
NUMBER

FIG. 17B

RECOGNIZING GEOMETRICALLY SALIENT OBJECTS FROM SEGMENTED POINT CLOUDS USING STRIP GRID HISTOGRAMS

RELATED APPLICATION

This patent application is a continuation in part of U.S. patent application Ser. No. 12/644,349 filed on Dec. 22, 2009, which is incorporated herein as though set forth in full.

STATEMENT REGARDING FEDERALLY SPONSORED RESEARCH OR DEVELOPMENT

This invention was made with Government support under contract number HM1582-07-C-0017, entitled, "Urban Reasoning and Geospatial Exploitation Technology (URGENT)," awarded by DARPA. The Government has certain rights in this invention.

FIELD

This disclosure relates to 3D recognition systems for sensor collected data, and more particularly to 3D recognition systems for 3D point cloud data generated by LIDAR, time-of-flight imagers, laser scanners, stereo imagers, or other sensors for sensing and automated understanding of 3D environments.

BACKGROUND

The data collected by LIDAR, time-of-flight imagers, laser scanners, stereo imagers, or other related sensors contains millions of data points that store the spatial coordinates of the each data point along with any other information, such as RGB color information. Advances in sensor technology have enabled such colorized point cloud data to be routinely collected for large urban scenes using both ground-based and airborne LIDAR sensor platforms.

LIDAR (Light Detection and Ranging) is an optical remote sensing technology that measures properties of scattered light to find range and/or other information of a distant target. The prevalent method to determine distance to an object or surface is to use laser pulses. The result of scanning an urban scene, for example, with a LIDAR is millions of data points $p_n$ each having three dimensional x, y and z spatial coordinates $p_n = (x,y,z)$.

Once the millions of points have been collected the problem is to recognize meaningful objects from the millions of points from objects such as buildings, trees, and streets. Humans do not see millions of points, but instead seemingly effortlessly break the scene down into buildings, trees, cars, etc. Humans are further assisted by prior knowledge of the world, which enables sifting through the seemingly infinite number of possibilities to determine a few plausible ones. For example, humans know that objects such as buildings rest on the ground, and so human use this information to determine the ground plane in the vicinity of the objects.

Estimating where the ground plane is from the millions of collected points collected by a sensor is a challenge. However, if this can be done with reasonable accuracy then the groundwork is laid to recognize other meaningful objects in the millions of collected points.

Some prior art techniques to recognize objects, as well as the ground plane, rely on strict assumptions on the serial ordering of the collected 3D scan lines. One approach is to try to reconstruct surface meshes by triangulation of the points, which can be slow, sensitive to noise, and makes assumptions about sampling density. The prior art also attempts to directly process the individually collected data points, which introduces scalability issues.

Another approach in the prior art is to build intermediate representations that reduce resolution and may be sensitive to quantization. Yet another approach that has been tried is to use level sets and other continuous approximations like B-splines, which have lower memory requirements, but cannot easily handle sharp edges or peaks in the data.

Yet another approach using mesh-based representations requires non-trivial processing to construct and cannot be updated with new incoming data. Other implicit geometry representations such as voxels allow efficient processing, but may be sensitive to missing information and empty cells since they only store local statistics.

All of these approaches attempt to find objects such as buildings, trees, cars and streets, and also attempt to find other more obscure objects such as poles, powerlines and posts. These approaches also attempt to estimate the ground plane. However, all of these prior art approaches have disadvantages and are not robust.

Recent advances in range measurement devices have created new challenges for fast 3D modeling of large-scale outdoor environments. The prior art has not been shown to work effectively on high resolution aerial and terrestrial data to recognize a wide spectrum of object types, including objects such as powerlines, posts, poles, construction cranes, and recognition of merged cars that occur because they are closely parallel parked, for example, or parked side by side in a parking lot. Also prior art approaches for detecting woods and forested regions have relied on 2D imagery rather than 3D sensor data. Thus, these prior art techniques do not work well in recognizing these objects in 3D sensor data.

What is needed is a method for estimating the ground plane and recognizing objects such as buildings, powerlines, posts, poles, construction cranes, and merged cars. Also needed are methods for detecting woods and forested regions from millions of collected 3D data points. The embodiments of the present disclosure answer these and other needs.

SUMMARY

In a first embodiment disclosed herein, a method of recognizing geometrically salient objects from sensed data points collected in a 3D environment comprises sensing the 3D environment using a sensor that collects a plurality of sensed data points from the 3D environment, each sensed data point having spatial coordinate information in three dimensions x, y and z; populating a strip histogram grid having a plurality of strips, each strip having a z, a dx dimension and a dy dimension, wherein dx is a portion of an x dimension of the strip histogram grid and dy is a portion of a y dimension of the strip histogram grid, by assigning each sensed data point to a strip in the strip histogram grid that has x, y and z dimensions that encompass the spatial coordinate information of the respective assigned sensed data point; and segmenting the strip histogram grid into a plurality of segmented regions, each segmented region comprising one strip or a group of neighboring strips having similar attributes.

In another embodiment disclosed herein, a method of recognizing geometrically salient objects from sensed data points collected in a 3D environment comprises sensing the 3D environment using a sensor that collects a plurality of sensed data points from the 3D environment, each sensed data point having spatial coordinate information in three dimensions x, y and z, populating a strip histogram grid having a plurality of strips, each strip having a z, a dx dimension and a dy dimension, wherein dx is a portion of an x dimension of the strip histogram grid and dy is a portion of a y dimension of the strip histogram grid, by assigning each sensed data point to a strip in the strip histogram grid that has x, y and z dimensions that encompass the spatial coordinate information of the respective assigned sensed data point, determining a height $S^H$=maximum z for each strip in the strip histogram grid and storing the height $S^H$ for each strip in computer readable memory, and marking a respective strip in the strip histogram grid as a potential power line strip if there are a threshold number of unpopulated cells below the height $S^H$ for the respective strip and the height $S^H$ for the respective strip is greater than a height threshold, wherein each strip is divided into a plurality of cells, each cell having a dimension of dx, dy, and dz.

In yet another embodiment disclosed herein, a method of recognizing geometrically salient objects from sensed data points collected in a 3D environment comprises sensing the 3D environment using a sensor that collects a plurality of sensed data points from the 3D environment, each sensed data point having spatial coordinate information in three dimensions x, y and z, populating a strip histogram grid having a plurality of strips, each strip having a z, a dx dimension and a dy dimension, wherein dx is a portion of an x dimension of the strip histogram grid and dy is a portion of a y dimension of the strip histogram grid, by assigning each sensed data point to a strip in the strip histogram grid that has x, y and z dimensions that encompass the spatial coordinate information of the respective assigned sensed data point, determining for each strip a longest array of consecutively populated cells from a local ground plane estimate for the strip to compute a bottom-up height $S^C$, wherein each strip is divided into a plurality of cells, each cell having a dimension of dx, dy, and dz, and labeling a respective strip as a potential post if the bottom-up height $S^C$ for the respective strip is less than or equal to a height threshold, the cells for the respective strip are unpopulated for a distance threshold above the bottom-up height $S^C$, and the cells up to the bottom-up height $S^C$ for the respective strip are populated with at least a population threshold number of sensed data points.

These and other features and advantages will become further apparent from the detailed description and accompanying figures that follow. In the figures and description, numerals indicate the various features, like numerals referring to like features throughout both the drawings and the description.

BRIEF DESCRIPTION OF THE DRAWINGS

FIGS. 5A and 5B show flow diagrams for a method of determining a local ground plane in accordance with the present disclosure;

FIGS. 6A and 6B show flow diagrams for a method of determining smooth surfaces in accordance with the present disclosure;

FIGS. 7A and 7B show flow diagrams for a method of building segmentation in accordance with the present disclosure;

FIG. 8 shows a flow diagram for a method of top down segmentation in accordance with the present disclosure;

FIG. 9 shows a flow diagram for a method of bottom up segmentation in accordance with the present disclosure;

FIG. 11 shows a flow diagram for a method of recognizing geometrically salient objects from segmented point clouds using strip grid histograms in accordance with the present disclosure;

FIG. 12 shows a flow diagram for a method of recognizing woods or forested regions from segmented point clouds using strip grid histograms in accordance with the present disclosure;

FIG. 13 shows a flow diagram for a method of recognizing merged cars from segmented point clouds using strip grid histograms in accordance with the present disclosure;

FIG. 14 shows a flow diagram for a method of recognizing poles from segmented point clouds using strip grid histograms in accordance with the present disclosure;

FIG. 15 shows a flow diagram for a method of recognizing construction cranes from segmented point clouds using strip grid histograms in accordance with the present disclosure;

FIGS. 16A and 16B show flow diagrams for a method of recognizing power lines from segmented point clouds using strip grid histograms in accordance with the present disclosure; and FIGS. 17A and 17B show flow diagrams for a method of recognizing posts from segmented point clouds using strip grid histograms in accordance with the present disclosure.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

Figure 1A:
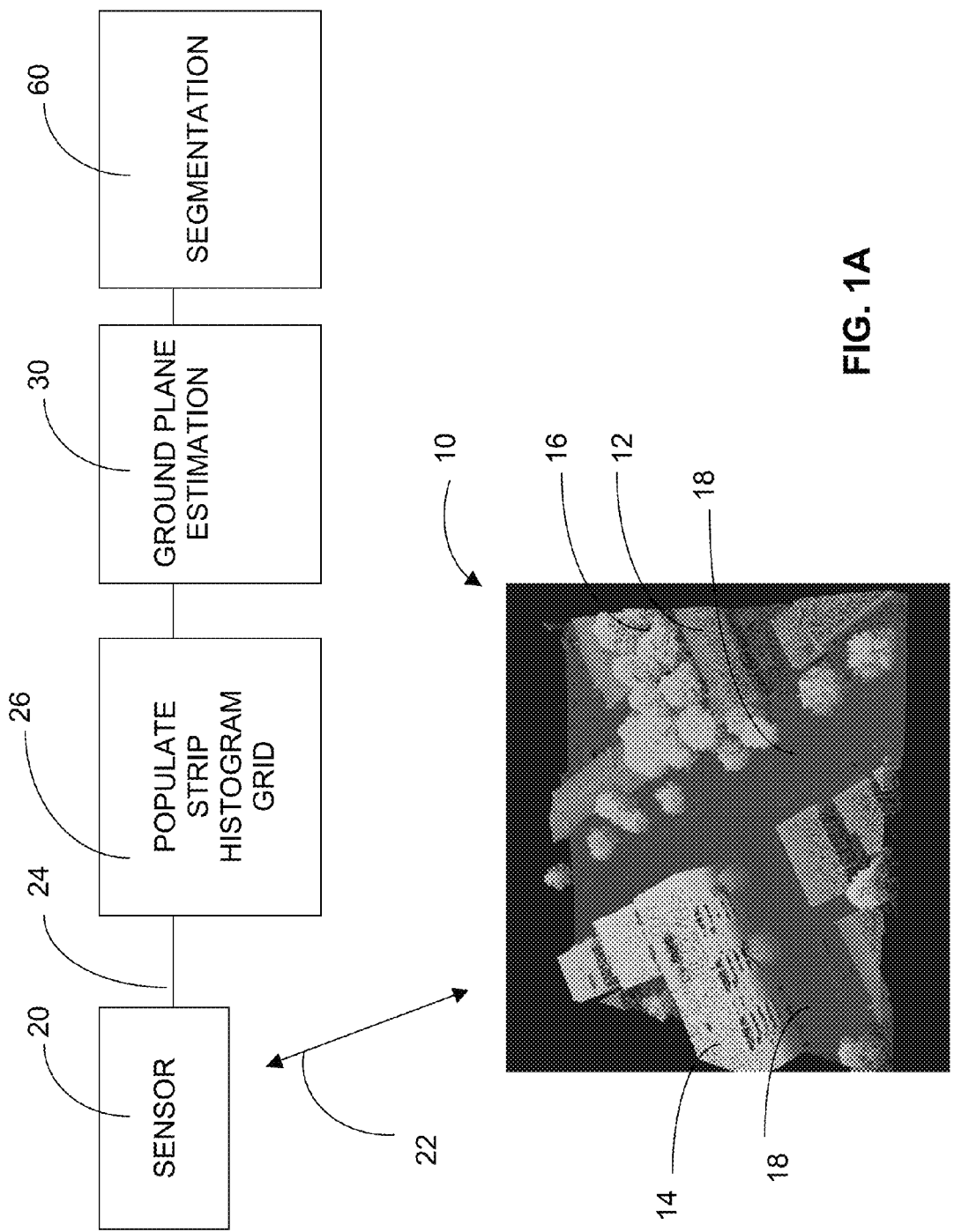
FIGS. 1A and 1B show block diagrams of a system for ground plane estimation and segmentation for sensor collected 3D point clouds in accordance with the present disclosure.

Referring to FIG. 1A, a block diagram is shown of a system for ground plane estimation and segmentation for sensor collected 3D point clouds in accordance with the present disclosure. A typical urban scene 10 is shown, which includes buildings 12 and 14, trees 16 and street 18, among other features. A sensor 20, which may be a LIDAR or other sensor, senses each sensed data point in the scene 10 via signals 22 and delivers a 3D point cloud of data 24 to a process 26 for populating a strip histogram grid (SHG).

All the methods disclosed in the present disclosure are performed on computer hardware that includes processor hardware and computer readable memory. The sensor data points collected by the sensor 20 are written onto the computer readable memory, which is fully accessible by the processor hardware. The computer hardware may be a desktop computer.

Figure 2:
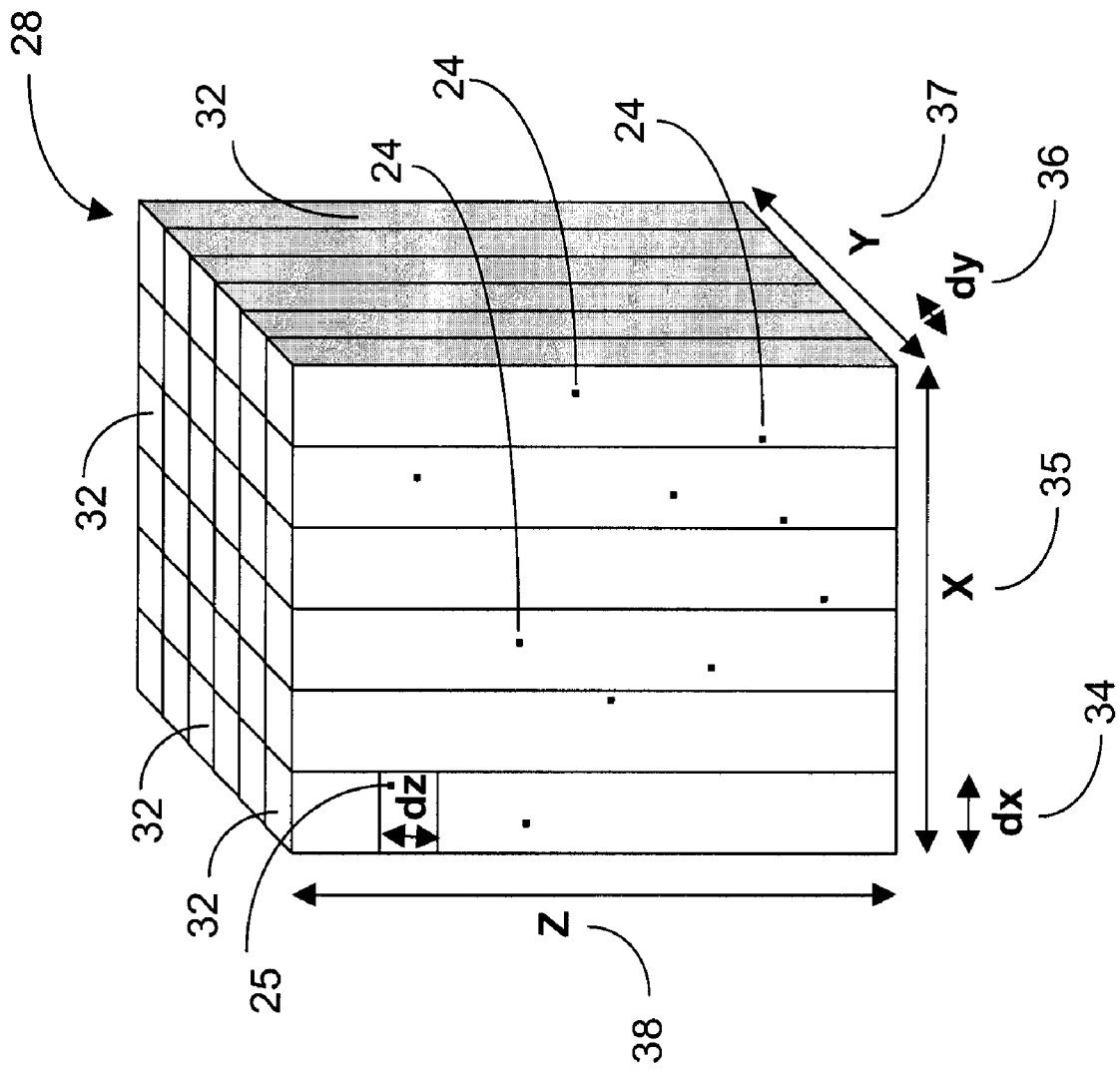
FIG. 2 shows a perspective view of a strip histogram grid in accordance with the present disclosure.

FIG. 2 shows a populated SHG 28. Each sensed data point from the 3D environment p(x,y,z) 24 has spatial coordinate information in three dimensions x, y and z, which may be in UTM coordinates. The SHG 28 includes a plurality of strips 32 and may have x 35, y 37, and z 38 extents at least as large as a maximum extent of the spatial coordinate information of the sensed data points p(x,y,z). The dimension of each strip 32 may have a dx 34 dimension equal to a dy 36 dimension, wherein dx 34 is a portion of the X 35 dimension and dy 36 is a portion of the Y 37 dimension. The SHG 28 is populated by assigning each sensed data point p(x,y,z) 24 to a strip 32 in the strip histogram grid 28 that has x, y and z dimensions that encompass the spatial coordinate information of the assigned sensed data point.

Figure 3:
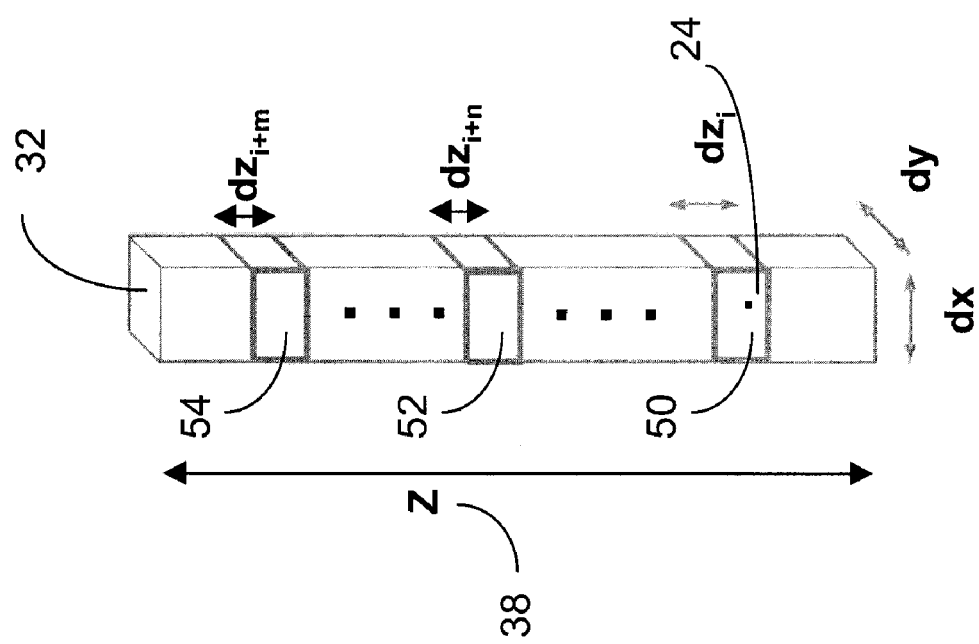
FIG. 3 shows a perspective view of one strip of a strip histogram grid in accordance with the present disclosure.

FIG. 3 shows a perspective view of one strip 32 of a strip histogram grid in accordance with the present disclosure. The strip 32 is further divided into cells 50, 52, 54, and so on that each have a dx, dy and dz size. In one embodiment the cells may have a dimension of dx=dy=dz=32 cm. Each p(x,y,z) 24 is further assigned to a cell in a strip 32. For example, sensed data point 25 in FIG. 2 is assigned to a cell with dimension dx, dy, dz at an appropriate location in the strip grid.

When dealing with outdoor 3D sensor data, arguably the most important cue is a reliable estimate of the ground plane. A single global ground plane may be computed by histogramming the z-values of all points and estimating the lowest level with enough supporting points, which would suffice if the terrain is mostly flat. However, often 3D sensor data spans a large area with several topographical variations like undulating hills, steep cliffs, water-bodies, etc.

According to the present disclosure, each strip 32 obtains an estimate of the local ground plane using information of sensor data points within the strip 32 as well as information of sensor data points in strips surrounding the strip. This is to increase robustness to any outlier sensor data points, for example, points below the actual ground and stray disconnected points that do not belong to a real-world object, which are common problems when data is collected using a sensor 20. Diffusely reflecting target objects like bushes and trees can also introduce erroneous points in LIDAR and other sensor data collected outdoors.

Figure 4:
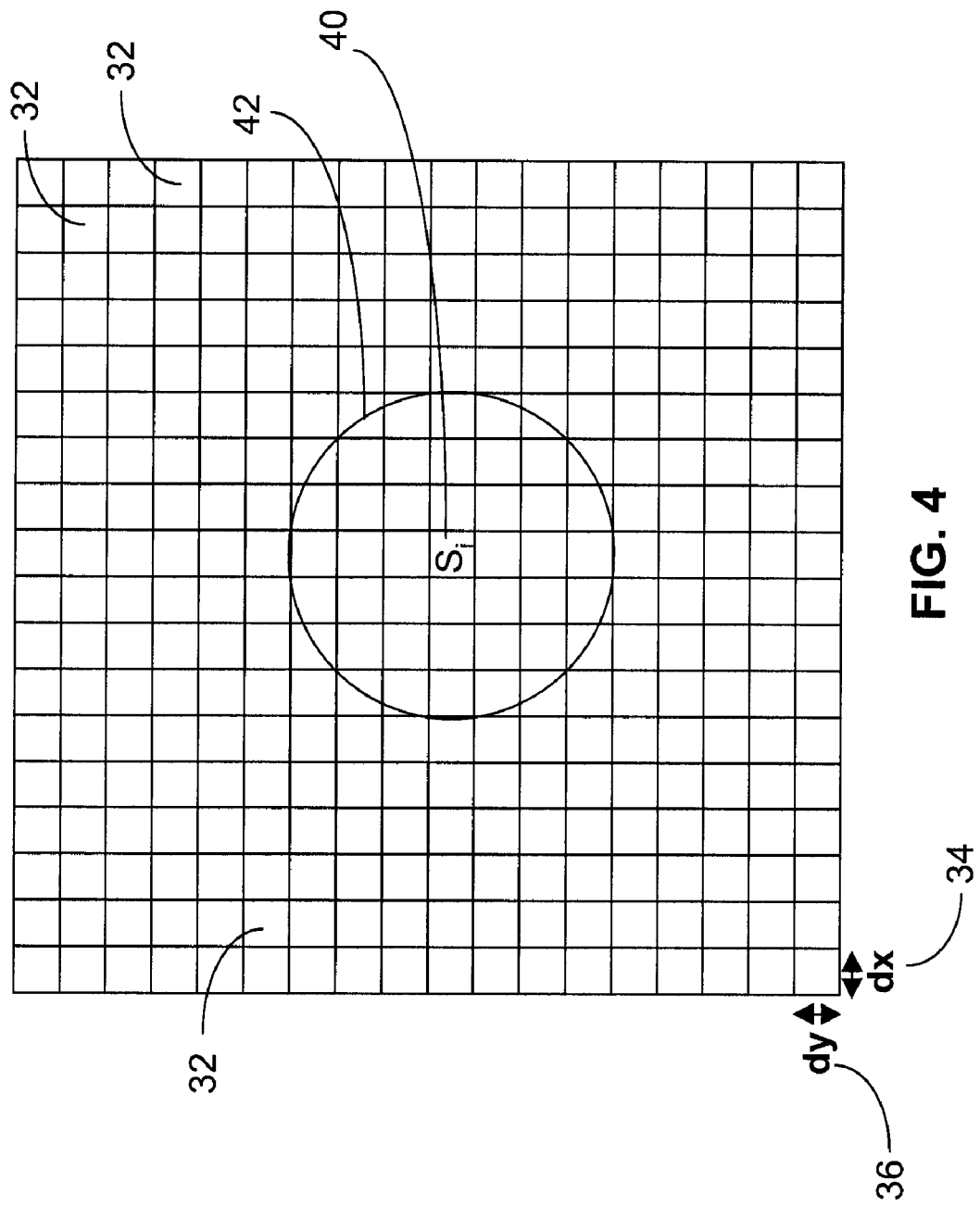
FIG. 4 shows a top view of a strip histogram grid in accordance with the present disclosure.

Ground plane estimation 30 starts by associating with every cell k, such as cell 50 in strip $S_i$ 32 (with dimensions dx, dy, and dz) a ground support variable $G_i(k)$ that is first initialized to 0. Whenever a point is added to strip cell $S_i(k)$, which may be cell 50 for example, it increments $G_j(k)$ of all strips j that fall within the neighborhood of $S_i$ with a corresponding cell k, which defines cells at the same coordinate z. This neighborhood is defined as a circular region 42, which may have a 1 meter radius centered on $S_i$ 40, as shown in FIG. 4, or from a 3×3 set of strips surrounding the strip $S_i$ 40.

Once all the input sensor data points have been added to populate a strip histogram grid (SHG), strip properties may be computed based on the accumulated evidence. The local ground plane $S_i^{gnd}$ for strip i is estimated as the lowest z-level cell with $G_i(k)$ greater than threshold $t_{gnd}$. A reasonable value for $t_{gnd}$ is 100, but can be changed depending on sensor resolution. The method for determining the local ground plane is further described in steps 200 to 212 in the flow diagrams of FIGS. 5A and 5B.

Other features stored for each strip 32 may include strip height=maximum z for p(x,y,z) within the strip minus the local ground plane $S_i^{gnd}$ for the strip, extent of z-value within the strip $S_i^{z\ min}$=min z for sensed data points in the strip and $S_i^{z\ max}$=max z for sensed data points in the strip, boolean flag $S_i^{POP}$ denoting whether a strip is populated above the local ground plane $S_i^{gnd}$ for the strip, number of points above the local ground plane $S_o^{pts}$, number of continuously populated cells above local ground plane $S_i^C$, and the local terrain slope $S_i^{zslope}$ computed on a 3×3 strip neighborhood.

Segmentation 60, as shown in FIG. 1A, involves grouping neighboring strips that have similar attributes and proceeds in stages. Global information gleaned from previous stages may bring in additional context. In the present disclosure, a graph-based approach to segmentation is used that partitions strips 32 into regions such that each region ideally corresponds to a 3D object in the world. Each strip 32 has edges to its 8-connected neighbor strips. Edge weights between strips should be lower if they belong to the same object, and higher if the strips belong to different objects. The edge weights are derived from a set of predicate P functions that measure the compatibility between two neighboring strips $S_i$ and $S_j$.

Initialization for an input point cloud consists of populating the strip histogram grid 28 and computing the attributes, such as the local ground plane estimate 30 for a strip 32, as described above. Then a grouping engine performs segmentation in multiple phases. Each pass calls Algorithm 1, shown below, and involves a graph traversal to separate out coherent regions, which takes only a few milliseconds on a regular desktop.

Figure 1B:
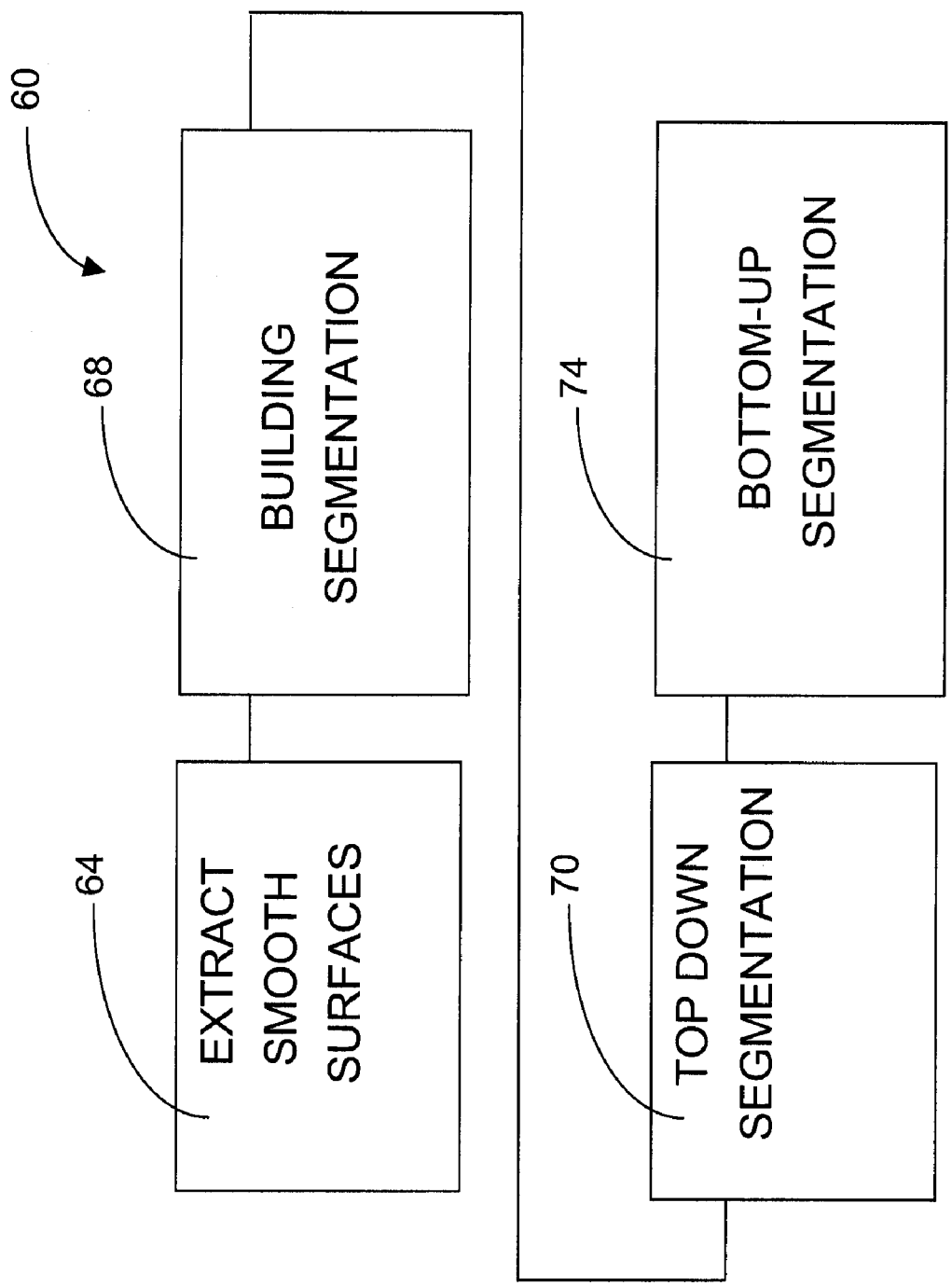

The first phase 64 of segmentation 60, as shown on FIG. 1B, extracts smooth surfaces—often a good indication of man-made structures in urban environments. The second phase 68 of segmentation 60 grows the smooth regions outward to precisely segment out building areas. The third phase 70 of segmentation 60 is a top-down segmentation that exploits height constraints to identify boundaries between objects. Since the latter may miss shorter objects that fall under larger structures like trees, a fourth bottom-up segmentation phase 74 attempts to identify objects that project out from the ground plane. While most regions are then passed to a classifier for object recognition, some objects that rely on larger context are more easily identified within the described framework itself.

The grouping engine makes use of binary predicate functions due to their simplicity and efficiency. A breadth-first graph traversal extracts out connected components. Though greedy, the results demonstrate that these compatibility constraints are able to produce very natural segment boundaries. The pseudo-code for the grouping engine is illustrated in Algorithms 1 and 2, shown below.

Each phase uses the above framework while defining the two functions V(s) and P(u,v) that are tailored for different goals. V(s) determines whether grouping for a particular component may start at strip S, then all reachable strips from strip S (based on compatibility predicate P) are extracted and labeled by LABELREACHABLESTRIPS. The following describes each phase of the grouping process.

Segmentation Framework

---

Algorithm 1 SEGMENTSTRIPS(S)

curlabel ← 0
for each strip s ∈ S do
   $s^{label}$ ← NIL
end for
for each strip s ∈ S do
   if V(s) = true and $s^{label}$ = NIL then
      LABELREACHABLESTRIPS (s, curlabel)
   end if
   curlabel ← curlabel + 1
end for

| Algorithm 2 LABELREACHABLESTRIPS (s, id) |
| --- |
| visited [0..N − 1] = false |
| Q ← ∅ |
| ENQUEUE (Q, s) |
| visited[s] = true |
| while Q ≠ ∅ do |
|    u ← DENQUEUE (Q) |
|    $u^{label}$ ← id |
|    for each strip v ∈ NBRS (u) do |
|      if visited[v] = false then |
|        if $v^{label}$ = NIL and P(u, v) = true then |
|          visited[v] = true |
|          ENQUEUE (Q, v) |
|        end if |
|      end if |
|    end for |
| end while |

The first phase 64 of segmentation 60 extracts smooth surfaces, which are good indicators of large man-made structures such as buildings. Further, regularity in height may be a sufficient signature for making this identification. A significant amount of processing time is thus avoided because there is no need for independent point classification by surface estimation or other local neighborhood methods. First, a 3×3 strip neighborhood is used to compute partial derivatives of strip height $S_i^H$ along the X and Y axes, following which the local height slope $S_i^{HZSLOPE}$ for each strip i is estimated. A strip is labeled as smooth $S^{sm}$=true if the range of slope within the neighborhood is less than a threshold $t_z$=10. For robustness, at least 5 out of 8 neighboring strips may be required to pass this constraint.

A compatibility criterion determines whether or not two strips can belong to the same group. 3D data is inherently less ambiguous than 2D images, allowing the use of simple formulations that are powerful and efficient. For two adjacent strips $s_i$ and $s_j$, the grouping engine uses the following predicate to extract out smooth surfaces:

$$P_{sm}(s_i, s_j) = \begin{cases} \text{true iff} & \begin{array}{l}(s_i^{sm} \text{ and } s_j^{sm} \text{ and} \\ |s_i^{zmax} \text{ or } s_j^{zmax}| < 10) \\ \text{OR} \\ ((s_i^{sm} \text{ or } s_j^{sm}) \text{ and} \\ |s_i^{zslope} - s_j^{zslope}| < 10)\end{array} \end{cases} \quad (1)$$

The first condition is valid if two smooth strips have similar height (within for example 10 cm) and the second condition captures strips that belong to smooth but inclined surfaces. These extracted regions will mostly correspond to flat or gabled roofs of buildings. Though split up at every roof indentation, they are very useful as seeds for identifying potential building structures. A post-process filtering operation removes very small smooth regions (less than 20 square meters) and components that have an excessive percentage of tall strips (ground points should not be visible under the roofs). The method for extracting the smooth surfaces is further described in steps 220 to 230 in the flow diagrams of FIGS. 6A and 6B.

The second phase 68 of segmentation is building segmentation, and smooth regions can be important cues for building segmentation. Buildings are very large and have unique geometric signatures that are best exploited in a separate phase. Recognizing building regions early also provides valuable context information for urban scenes. The smooth surfaces extracted in the previous section provide seeds that must be grown and merged with other surfaces to encompass the whole building. A key challenge in urban scenes is to geometrically separate out the roof from trees at a similar height and closely hugging the building facade. On the other hand, roof strips around building edges exhibit many interesting elevation patterns; this causes them to be excluded from the surfaces extracted above and requires merging.

To resolve these two competing goals, information from the smoothness map and information from a ground map are fused to identify definitely non-building areas. The intuition here is that unlike under roofs, the ground points are visible under trees and vegetation. First, an image $G_M$ is calculated of dimensions $N_x \times N_y$, where each pixel in the image $G_M$ contains the minimum height from the ground plane of all points in that strip. Let $S_M$ be another image that stores the height of all smooth strips. A provisional map $B_{PM}$=max($G_M$,$S_M$) is produced by doing a pixel-wise or strip-wise max operation to set the height of the strips to $S_{BM}$ in the $B_{PM}$. $B_{PM}$ is then median filtered and dilated for three iterations to produce a building map $B_M$. Finally, all strips or pixels in $B_{PM}$, with height $S^{BM}$ less than 3 meters, are set to 0.

The ground map is a good indicator of true ground, but is less reliable and noisy along building edges and under roofs. This is because of many spurious sensor data points may lie inside the buildings. The max operation compensates for this by replacing pixels in smooth regions with the height of the roof. The dilation on the fused map serves to increase the margin around buildings so that broken edges along the facade may be combined. The net effect of these operations is that the buildings become prominent while the ground map suppresses the effect of adjacent trees preventing segmentation from spiraling out of control.

The predicate function for building segmentation is defined as:

$$P_{bld}(s_i, s_j) = \begin{cases} \text{true iff} & \begin{array}{l}(s_i^{sm} \text{ and } s_j^{sm} \text{ and } R \leq 1.4) \\ \text{OR} \\ (|s_i^{BM} - s_j^{BM}| < 300 \text{ and} \\ R \leq 1.2).\end{array} \end{cases} \quad (2)$$

The ratio of heights between two strips $$R = \frac{\max(s_i^H, s_j^H)}{\min(s_i^H, s_j^H)}$$

is used to identify discontinuities. The first condition thus allows two smooth strips possibly belonging to different roofs to merge. The second condition connects loose strips at the edges of the facade while using $B_M$ to avoid capturing non-building strips. Adjacent strips with a difference in $B_M$ of 3 meters or more are not allowed to merge. The method for building segmentation is further described in steps 240 to 250 in the flow diagrams of FIGS. 7A and 7B.

The third phase of segmentation 60 is top-down segmentation 70 and is performed by exploiting the nature of height distribution in the real world to determine object connectivity. Unlike some images, color and intensity information included in sensor data, such as LIDAR sensor data, may not be reliable or consistent enough for good 3D segmentation. It is also not desirable to make assumptions on the ordering of point acquisition, which allows data collected with different sensors or different collection times to be combined transparently.

Objects in an urban setting are smooth and height discontinuities often correspond to possible boundaries. Top-down segmentation assumes that all strip points above the ground belong to the same object. This is equivalent to a nadir view of the scene where only objects that are not blanketed by other overhanging structures are visible. These excluded objects usually correspond to small street-side entities like trashcans or fire-hydrants that fall under surrounding foliage. Objects that fall under power-lines may also be "hidden" for the same reason. Nevertheless, over 70% of the objects—especially the larger structures in an urban scene can be retrieved in this scheme. Top-down view of the scene combined with the strip representation allows extremely efficient processing. Where the points are all captured from an aerial sensor, this scheme alone is sufficient for segmentation as the sides of objects are seldom visible without ground data.

The predicate used for top down segmentation is only applied to strips that have not already been classified as belonging to a building. It uses the ratio of heights between adjacent populated strips:

$$P_{td}(s_i, s_j) = \begin{cases} \text{true iff} & (s_i^{POP} \text{ and } s_j^{POP}) \text{ AND } \text{ and } R = \frac{\max(s_i^H, s_j^H)}{\min(s_i^H, s_j^H)} \\ & R \leq 1.4). \end{cases} \quad (3)$$

The method for top down segmentation is further described in steps 260 to 266 in the flow diagram of FIG. 8.

The fourth phase of segmentation 60 is bottom-up segmentation 74. Ground sensors capture several street-side objects that will not be visible to an aerial sensor due to occlusion or lack of resolution. In contrast to top-down segmentation, bottom-up segmentation identifies highly populated strips projecting up from the ground and then proceeds to group them based on height. Rather than taking the maximum z-value of points in the strip as its height $S^H$, the distribution of points within the strip cells is exploited. The longest array of consecutively populated cells from the ground plane estimate $S^C$ is identified to compute a bottom-up height $S^C$. A vertical Gaussian weighted population in each cell should exceed threshold $t_c=5$ to be considered populated. Since ground data is more prone to noise and clutter, using a larger vertical neighborhood makes computation of $S^C$ robust.

The predicate function $P_{bup}$ for bottom-up segmentation is similar to $P_{td}$, except that all height computations are based on $S^C$ instead of the top-down strip height. Again, similar to top down segmentation, the predicate for bottom up segmentation is only applied to strips that have not already been classified as belonging to a building.

$$P_{bup}(S_i,S_j)=\text{true iff } (S_i^{POP} \text{ and } S_j^{POP}) \text{ AND } R<1.4) \quad (4)$$

where
$S_i^{POP}$=true if bottom-up-height $S^C$ is not zero i.e. there is something in the strip above the local ground plane.
$S_j^{POP}$=true if bottom-up-height $S^c$ is not zero i.e. there is something in the strip above the local ground plane.
and R=max $(S_i^c, S_j^c)$/min $(S_i^c, S_j^c)$, which is the ratio of bottom-up-heights.
The method for bottom up segmentation is further described in steps 270 to 276 in the flow diagram of FIG. 9.

Finally, since each segment is input to a larger recognition system to filter out implausible objects that do not have enough points. The minimum threshold is set to 35 points above the ground. Very tiny segments adjacent to larger structures are also merged. If not surrounded by ground, these small regions are more likely to be the result of an incorrect grouping. Building segmentation requires that the median height of boundary strips in a region exceed 2 meters. This captures the notion of vertical walls from the ground along the sides of the building, even though points need not be visible on the facade. Some of the bottom-up cues for small isolated objects may be redundant with the top-down segments. Simple area and height overlap constraints are used to identify such cases. Only the top-down segment is retained since it is better at capturing the full extent of the object.

Another key ingredient when processing large 3D sensor point clouds is efficiency. A dataset may contain 950 million points spanning a 3.3 km² area distributed across 380 tiles. Processing close to a billion points has been demonstrated to take less than an hour on a 2.93 GHz processor with 4 GB of RAM. Disk input/output to read the tiles took another 40 minutes. Processing time is dominated by the strip initialization phase that computes the local ground plane estimate. The average initialization time per tile was 8.3 seconds while grouping took only 1.0 second per tile. Since a processing speed at 270,000 points per second is much faster than a typical sensor bandwidth, the algorithms in this disclosure are well suited to real-time sensor applications, such as LIDAR.

Segmentation groups the 3D sensor data points into hundreds of coherent regions. Rather than working directly with each primitive point as in previous algorithms, segmentation allows recognition modules to instead work on the boundaries and the relevant points contained within a segmented region. Properties of points within the segmented region can be examined to extract geometric signatures for recognition. Without segmentation, a recognition algorithm would have to search across all offsets and scales—an intractable problem when the data contains almost a billion points spanning several kilometers in area.

As described above, a sensor 20 collects 3D sensor data points p(x,y,z) and then a strip histogram grid 28 is populated 26. Segmentation 60 is performed to segment the populated strip histogram grid into segmented regions and occurs in phases including extraction of smooth surfaces 64, building segmentation 68, top down segmentation 70 and bottom up segmentation 74.

Figure 10:
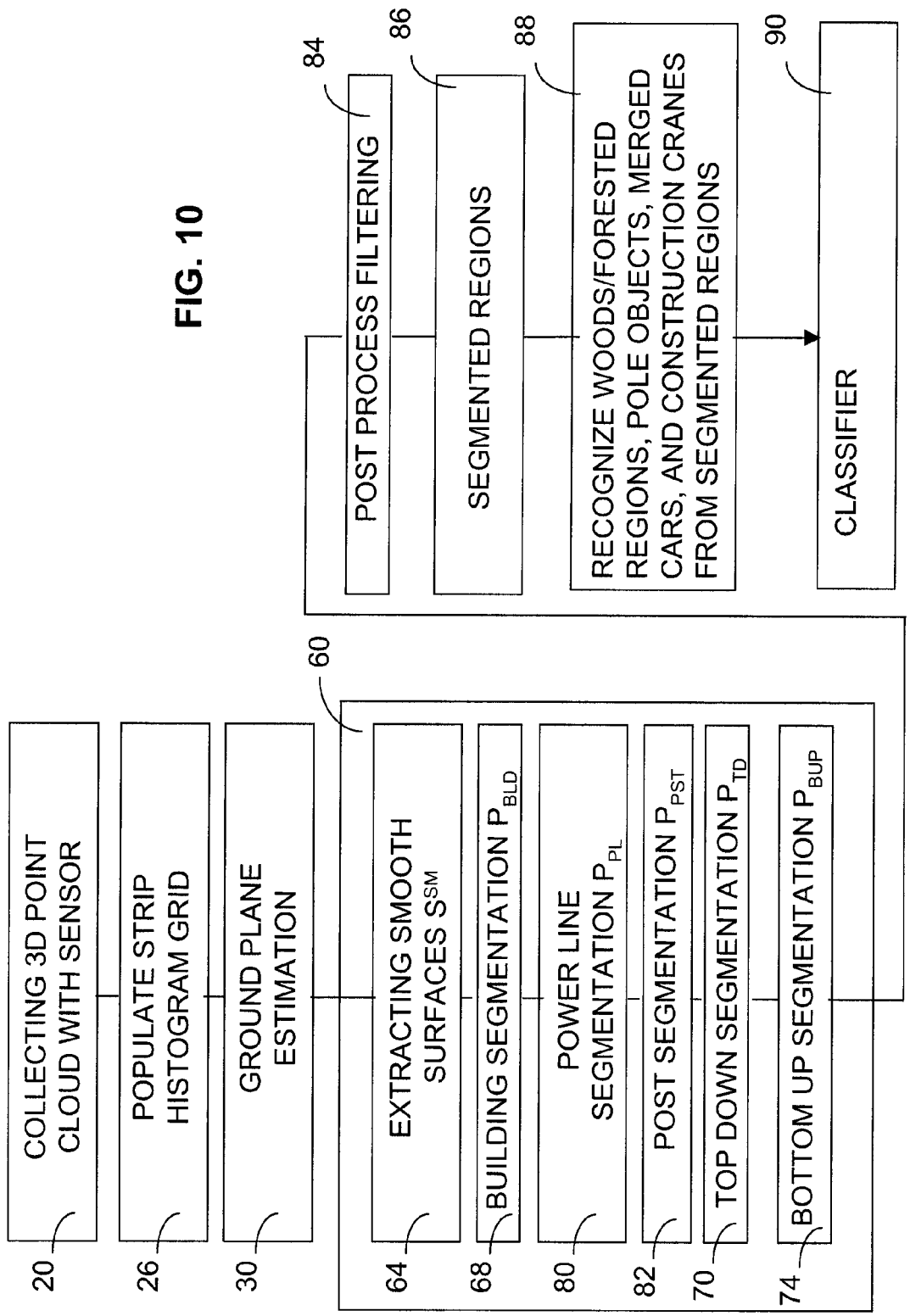
FIG. 10 shows a block diagram of a system for ground plane estimation, segmentation, and recognition of objects in sensor collected 3D point clouds in accordance with the present disclosure.

In accordance with the present disclosure, FIG. 10 shows a block diagram of a system for recognizing geometrically salient objects from segmented point clouds using strip grid histograms. The system includes sensor collection of 3D sensor data points 20, population of a strip histogram grid 28 with the 3D sensor data points 26, ground plane estimation 30, segmentation 60, and post process filtering 84, which result in segmented regions 86. Then recognition process 88 is used to recognize woods/forested regions, poles, merged cars, and construction cranes from the segmented regions 86. Finally any further recognition of objects is performed by classifier 90.

As shown in FIG. 10, power line segmentation 80 and post segmentation have been added to segmentation 60. Recognition 88 of objects, such as woods and forested regions, poles, merged cars, and construction cranes is performed after segmentation 60 as illustrated in FIG. 10. According to the present disclosure, recognition of these objects is accomplished by examining geometric shape properties of the segmented regions 86 to make a correct identification. Both inclusive and exclusive rules about an object may be used.

Some classes of objects require additional dedicated phases in segmentation 60. Power lines do not rest on the ground, but hang several meters above the ground, connected by poles, which is different than most objects that rest on the ground. The linear structure of power lines is an additional cue that may be exploited. Thus, power line segmentation 80 is a dedicated phase of segmentation 60.

Posts are extremely short objects and are often less than a meter high and may appear very close to each other. Their small size makes them sensitive to sensor positioning and difficult to distinguish from stray points above the ground. Thus, post segmentation 82 is another dedicated phase of segmentation 60.

As described above, buildings, power lines and posts are identified during segmentation 60, and process 88 recognizes segmented regions that are woods/forested regions, merged cars, poles, and construction cranes. Any other segmented regions that do not satisfy the constraints for buildings, power lines, posts, woods/forested regions, merged cars, poles or construction cranes are passed to the classifier 90.

Before describing power line segmentation 80 and post segmentation 82, first the geometric rules and constraints that allow us to recognize in process 88 woods/forested regions, merged cars, poles, and construction cranes in segmented regions are described.

The set of segmented regions can be represented by R and segmented region geometric properties and statistics may be computed for each segmented region $R_i$. The strips in the strip histogram grid that make up the region $R_i$ are determined by using a computer during segmentation 60 and stored in computer readable memory in the set $R_i^S$. To model an object's shape, the area $R_i^{area}$ height $R_i^h = \max S^H$ within the region, volume $R_i^{vol}$, centroid $R_i^C$, moment width $R_i^{mw}$ and moment length $R_i^{ml}$, orientation of the major axis $R_i^{theta}$, and total points above the ground $R_i^{pts}$ are calculated by a computer and stored in computer readable memory for the segmented region $R_i$. Moment width $R_i^{mw}$ and moment length $R_i^{ml}$ are calculated by aligning the shortest axis of the segmented region along say the Y axis to obtain the moment width and the longest axis of the segmented region along the X axis to obtain the moment length. While similar properties may also be calculated by a computer and stored in computer readable memory for each strip in the strip histogram grid, the segmented region geometric properties and statistics are more global and reflect characteristics of the entire segmented region.

In FIG. 11, steps 300 to 304 describe a method of recognizing geometrically salient objects from segmented point clouds using strip grid histograms in accordance with the present disclosure.

Even dense urban environments can contain large areas of woods or forested regions. Training a general purpose classifier for such an arbitrary structure is difficult. In the method of the present disclosure, the geometric and contextual properties of segmented regions are examined to determine if the segmented regions 88 are woods or forested regions. While similar to grammar-based topological reasoning, the method of the present disclosure works across an entire segmented region, which provides a larger context.

To label a segmented region as woods or a forested region, the segmented region must have a height $R_i^h$ greater than 10 m, an area $R_i^{area}$ greater than 200 square meters, and not containing any smooth strip ($S^{SM}$=NOT TRUE). Using these geometric properties is more robust than using 2D texture or intensity features alone.

In FIG. 12 steps 306 to 312 further describe the method of recognizing woods or forested regions from segmented point clouds using strip grid histograms in accordance with the present disclosure.

Cars are one of the more prominent objects found in outdoor urban scenes. They often occur in groups as cars parallel parked along a street or in a parking lot. In dense cities, there may be very little spacing between parked cars and the spacing may be as small as 10 to 15 cm. Thus, segmentation 60 may not be able to correctly delineate vehicle boundaries. The segmented regions for parked cars may therefore appear as merged cars. Another cause for these merged segment regions is that cars might move during data collection and cause ghosting artifacts between car boundaries. It is difficult to train classifiers to account for this as these segmented regions may contain anywhere from 2 to 20 cars merged together.

In the present disclosure, the geometric constraints applied for recognizing merged cars make use of the segmented region moment length $R_i^{ml}$, the segmented region moment width $R_i^{mw}$, segmented region height $R_i^h$, the segmented region area $R_i^{mw}$, and the segmented region area of a moment-based oriented rectangle $R_i^{ma}=R_i^{ml}*R_i^{mw}$.

According to the present disclosure, for a segmented region to be recognized as parallel parked cars the segmented region height $R_i^h$ should be less than 3.6 meters, the segmented region moment width $R_i^{mw}$ greater or equal to 2.0 and less than or equal to 2.9 meters, the segmented region moment length $R_i^{ml}$ greater than 8.0 meters, and the segmented region area $R_i^{area}$ divided by segmented region area of a moment-based oriented rectangle $R_i^{ma}=R_i^{ml}*R_i^{mw}$ greater than 80%.

This is formally expressed as $$P_{PPC}(R_i) = \begin{cases} R_i^h < 3.6 & \cap \\ 2.0 \leq R_i^{mw} \leq 2.9 & \cap \\ R_i^{ml} > 8.0 & \cap \\ \frac{R_i^{area}}{R_i^{ma}} > 0.8 \end{cases}$$

These dimensions will be different for cars parked side-to-side in a parking lot. According to the present disclosure, for a segmented region to be recognized as cars parked side-to-side in a parking lot, the segmented region height $R_i^h$ should be less than 3.6 meters, the segmented region moment width $R_i^{mw}$ greater or equal to 4.1 meters and less than or equal to 6.5 meters, the segmented region moment length $R_i^{ml}$ greater than 5.0 meters, and the segmented region area $R_i^{area}$ divided by segmented region area of a moment-based oriented rectangle $R_i^{ma}=R_i^{ml}*R_i^{mw}$ greater than 65%.

This is formally expressed as $$P_{PLC}(R_i) = \begin{cases} R_i^h < 3.6 & \cap \\ 4.1 \leq R_i^{mw} \leq 6.5 & \cap \\ R_i^{ml} > 5.0 & \cap \\ \frac{R_i^{area}}{R_i^{ma}} > 0.65. \end{cases}$$

The difference in dimensions is because the moment width of the cue in the case of parallel parked cars corresponds to the car width. In the second case, moment widths correspond to the car length. These numbers are consistent with the average dimensions of cars found in cities. Note once again that segmentation of the sensed data point cloud using the SHG makes these measurements easily available to construct and implement recognition rules. Attempting to recognize merged cars from an unsegmented pointcloud would be very difficult.

In FIG. 13 step 314 further describes the method of recognizing merged cars from segmented point clouds using strip grid histograms in accordance with the present disclosure.

Pole objects in an urban environment might belong to flagpoles, free-standing signs, telephone poles, or traffic signs. Training examples from all these classes can test a learning algorithm's generalizing ability. In contrast, in the present disclosure, poles are defined as tall, thin and connected set of populated voxels projecting up from the ground. Cues identified by the bottom-up grouping phase provide a natural means to identify such structures.

Bottom-up segmentation 74 marks highly populated strips projecting up from the ground and then segments them based on height. Unlike top-down segmentation 70 that takes the maximum z-value of points in the strip as its height $S^H$, in bottom-up segmentation 74 the distribution of points within the strip cells is exploited. The longest array of consecutively populated cells from the local ground plane estimate for a strip derived in ground plane estimation 30 is identified to compute a bottom-up height $S^C$. A cell is considered populated if a vertical Gaussian weighted population of the cell and neighboring cells in the strip is greater than a threshold $t_c=5$. Using a larger vertical neighborhood makes computation of $S^C$ more robust, because ground data is quite prone to noise and clutter.

A segmented region $R_i$ that has been segmented as a bottom-up segmented region ($P_{bup}$=true) is classified as a pole if it satisfies the following rule: $R_i$ contains no more than 2 strips and has a bottom-up height $S^C$ greater than 7 meters. Experiments with LIDAR data have achieved over 75% correct detection of pole-objects in a set of exhaustively ground truthed LIDAR data.

In FIG. 14, steps 320 to 324 further describe the method of recognizing poles from segmented point clouds using strip grid histograms in accordance with the present disclosure.

Construction cranes are unique objects in that they are extremely tall and have fan-like linear structures projecting out from the central stem. From empirical tests on a few examples, it has been observed that height alone is a very strong signature for these objects.

According to the present disclosure, for a segmented region to be recognized as a construction cranes the segmented region height $R_i^h$ should be greater than 35 meters above the ground plane estimate, have a segmented region area $R_i^{area}$ greater than 5 square meters, not be a segmented region that has been identified as a building, and have no adjacent strip $S_i$ that is in a segmented region that belongs to a building ($P_{bld}(S_i)$=NOT TRUE for adjacent strips). The building adjacency rule is used to prevent any break-away segmented regions along building facades being misclassified as a construction crane.

In FIG. 15, step 326 further describes the method of recognizing construction cranes from segmented point clouds using strip grid histograms in accordance with the present disclosure.

Power line structures are unique and do not adhere entirely to our assumptions regarding objects in the real world, which generally rest on the ground. Also power lines might be confused and merged with other objects at similar height —most notably trees. Because power lines are ubiquitous in urban locations, effective segmentation algorithms are needed to prevent this form of merging. Thus, power line segmentation 80 is another phase of segmentation 60.

Each strip in the strip histogram grid has a strip height $S^H$=maximum z for p(x,y,z) stored in computer readable memory. According to the present disclosure, a strip is marked as a potential power line strip if there are unpopulated cells, for example 4 cells in the strip, below this maximum z value, and the $S^H$=maximum z is greater than a height threshold, because power lines occur at a certain height above the ground. The height threshold may be 4 meters.

An 3D image $I_{pl}$ is formed which has the same resolution as the strip histogram grid (dx, dy) and heights in the Z dimension are set equal to the strip height $S^H$=maximum z for strips marked as potential power line strips. The heights in the Z dimension may be normalized to values between 0-255. The assumption is that within any vertical strip, power lines are the highest object and the maximum z-value corresponds to a point on the power line, which is usually a valid assumption in most urban scenes.

Ideally, power lines appear as long, thin lines on the image $I_{pl}$. A Hough Transform technique may be used to identify lines in the image. The Hough Transform is well known to those in the art and is a feature extraction technique used in image analysis, computer vision, and digital image processing. The classical Hough transform was concerned with the identification of lines in an image.

There may be outliers due to trees, but they can be eliminated with a minimum length threshold, which may be a length greater than 20 at the resolution of the image $I_{pl}$. Once the power lines are identified in the image $I_{pl}$, the corresponding strips in the strip histogram grid are segmented as power line strips.

In FIGS. 16A and 16B, steps 330 to 346 further describe the method of recognizing power lines from segmented point clouds using strip grid histograms in accordance with the present disclosure.

Posts often occur along a street or building perimeter and are very short. Incorporating post segmentation in the general classifier 90 would result in significantly higher false identifications, because the sensed data points from posts are noisy. Thus, post segmentation 82 is yet another phase of segmentation 60.

Posts may occur as a row of uniformly spaced structures each with a similar appearance, and may be between 0.8 and 1.5 meters tall.

According to the present disclosure, in post segmentation 82, as in pole identification, the longest array of consecutively populated cells from the local ground plane estimate for a strip derived in ground plane estimation 30 is identified to compute a bottom-up height $S^C$. To be segmented as a pole, the bottom-up height $S^C$ should be less than or equal to 1.5 meters and the cells for 1.5 meters above the bottom-up height $S^C$ should be unpopulated, which enforces a free-space rule. A strip that passes these constraints and contains a minimum of 40 points is marked as a potential post strip.

During post segmentation 82 a potential post strip is only allowed to merge with an adjacent potential post strip. Since posts are by definition not larger than 0.5 meters in diameter, then for strips with dx=dy=32 cm, any segmented region with more than 4 adjacent potential post strips is not segmented as a post segment. Strips that meet all of the foregoing constraints are segmented as posts. Additional global properties that look at the spatial arrangement of multiple posts may also be used, such as requiring posts to appear in a row.

In FIGS. 17A and 17B, steps 350 to 358 further describe the method of recognizing posts from segmented point clouds using strip grid histograms in accordance with the present disclosure.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

What is claimed is:

1. A method of recognizing geometrically salient objects from sensed data points collected in a 3D environment comprising:
    sensing the 3D environment using a sensor that collects a plurality of sensed data points from the 3D environment, each sensed data point having spatial coordinate information in three dimensions x, y and z;
    populating a strip histogram grid having a plurality of strips, each strip having a z, an dx dimension and a dy dimension, wherein dx is a portion of an x dimension of the strip histogram grid and dy is a portion of a y dimension of the strip histogram grid, by assigning each sensed data point to a strip in the strip histogram grid that has x, y and z dimensions that encompass the spatial coordinate information of the respective assigned sensed data point;
    segmenting the strip histogram grid into a plurality of segmented regions, each segmented region comprising one strip or a group of neighboring strips having similar attributes; and
    determining for each strip in the strip histogram grid whether the respective strip has a smoothness $S^{sm}$ property;
    wherein the respective strip is determined as having the smoothness $S^{sm}$ property if a range in local height gradient $S^{zslope}$ for strips within a strip neighborhood of the respective strip is less than a threshold $T_z$.

2. The method of claim 1 further comprising:
    labeling a segmented region as woods or a forested region if a respective segmented region has a segmented region height greater than a height threshold, a segmented region area greater than an area threshold, and the segmented region has no strip within the segmented region having the $S^{sm}$ smoothness property.

3. The method of claim 1 wherein determining for each strip in the strip histogram grid whether the respective strip has a smoothness $S^{sm}$ property comprises:
    computing partial derivatives of strip height $S^H$, wherein strip height is a maximum z dimension $S^{max}$ for an assigned sensed data point in a respective strip, along x and y axes for strips in a 3×3 strip neighborhood of the respective strip;
    estimating a local height gradient $S^{zslope}$ for the respective strip from the partial derivatives; and
    labeling the respective strip as smoothness $S^{sm}$=true if a range in local height gradient $S^{zslope}$ for the strips within the 3×3 strip neighborhood of the respective strip is less than a threshold T.

4. The method of claim 3 wherein:
    dx and dy are each equal to 32 cm; and
    the threshold $T_z$ is less than 10.

5. The method of claim 3 wherein only 5 out of 8 of the strips within the 3×3 strip neighborhood of the respective strip have a threshold $T_z$ less than 10.

6. The method of claim 2 wherein the height threshold is 10 meters and the area threshold is 200 square meters.

7. A method of recognizing geometrically salient objects from sensed data points collected in a 3D environment comprising:
    sensing the 3D environment using a sensor that collects a plurality of sensed data points from the 3D environment, each sensed data point having spatial coordinate information in three dimensions x, y and z;
    populating a strip histogram grid having a plurality of strips, each strip having a z, an dx dimension and a dy dimension, wherein dx is a portion of an x dimension of the strip histogram grid and dy is a portion of a y dimension of the strip histogram grid, by assigning each sensed data point to a strip in the strip histogram grid that has x, y and z dimensions that encompass the spatial coordinate information of the respective assigned sensed data point;
    segmenting the strip histogram grid into a plurality of segmented regions, each segmented region comprising one strip or a group of neighboring strips having similar attributes; and
    labeling a segmented region as merged cars if a respective segmented region has a segmented region height less than a height threshold, a segmented region moment width greater or equal to a first width threshold and less than or equal to a second width threshold, a segmented region moment length greater than a length threshold, and a segmented region area divided by the segmented region moment length times the segmented region moment width greater than a ratio threshold.

8. The method of claim 7 wherein the merged cars are labeled as parallel parked cars if:
    the height threshold is 3.6 meters;
    the first width threshold is 2.0 meters;
    the second width threshold is 2.9 meters;
    the length threshold is 8.0 meters; and
    the ratio threshold is 0.8.

9. The method of claim 7 wherein the merged cars are labeled as cars parked side to side in a parking lot if:
    the height threshold is 3.6 meters;
    the first width threshold is 4.1 meters;
    the second width threshold is 6.5 meters;
    the length threshold is 5.0 meters; and
    the ratio threshold is 0.65.

10. A method of recognizing geometrically salient objects from sensed data points collected in a 3D environment comprising:
- sensing the 3D environment using a sensor that collects a plurality of sensed data points from the 3D environment, each sensed data point having spatial coordinate information in three dimensions x, y and z;
- populating a strip histogram grid having a plurality of strips, each strip having a z, an dx dimension and a dy dimension, wherein dx is a portion of an x dimension of the strip histogram grid and dy is a portion of a y dimension of the strip histogram grid, by assigning each sensed data point to a strip in the strip histogram grid that has x, y and z dimensions that encompass the spatial coordinate information of the respective assigned sensed data point;
- segmenting the strip histogram grid into a plurality of segmented regions, each segmented region comprising one strip or a group of neighboring strips having similar attributes;
- performing bottom up segmentation to form segmented regions $R_{bup}$ having populated strips projecting up from a local ground plane estimate;
- determining for each strip a longest array of consecutively populated cells from the local ground plane estimate for the strip to compute a bottom-up height $S^C$, wherein each strip is divided into a plurality of cells, each cell having a dimension of dx, dy, and dz; and
- labeling a $R_{bup}$ segmented region as a pole if the respective $R_{bup}$ segmented region contains no more than a threshold number of strips and the bottom-up height $S^C$ for a strip in the respective $R_{bup}$ segmented region is greater than a height threshold.

11. The method of claim 10 wherein:
dx and dy are each equal to 32 cm;
the threshold number of strips is 2; and
the height threshold is 7 meters.

12. The method of claim 10 wherein:
a cell is considered populated if a vertical Gaussian weighted population of the cell and neighboring cells in the strip is greater than a population threshold.

13. The method of claim 10 wherein:
the population threshold is 5.

14. A method of recognizing geometrically salient objects from sensed data points collected in a 3D environment comprising:
- sensing the 3D environment using a sensor that collects a plurality of sensed data points from the 3D environment, each sensed data point having spatial coordinate information in three dimensions x, y and z;
- populating a strip histogram grid having a plurality of strips, each strip having a z, an dx dimension and a dy dimension, wherein dx is a portion of an x dimension of the strip histogram grid and dy is a portion of a y dimension of the strip histogram grid, by assigning each sensed data point to a strip in the strip histogram grid that has x, y and z dimensions that encompass the spatial coordinate information of the respective assigned sensed data point;
- segmenting the strip histogram grid into a plurality of segmented regions, each segmented region comprising one strip or a group of neighboring strips having similar attributes;
- labeling a segmented region as a construction crane if the respective segmented region contains at least one strip having a height above a ground plane estimate for the strip greater than a height threshold, an area for the respective segmented region is greater than an area threshold, the respective segmented region has not been identified as a building, and no adjacent strip $S_i$ to the respective segmented region belongs to a building.

15. The method of claim 14 wherein:
the height threshold is 35 meters; and
the area threshold is 5 square meters.

16. A method of recognizing geometrically salient objects from sensed data points collected in a 3D environment comprising:
- sensing the 3D environment using a sensor that collects a plurality of sensed data points from the 3D environment, each sensed data point having spatial coordinate information in three dimensions x, y and z;
- populating a strip histogram grid having a plurality of strips, each strip having a z, an dx dimension and a dy dimension, wherein dx is a portion of an x dimension of the strip histogram grid and dy is a portion of a y dimension of the strip histogram grid, by assigning each sensed data point to a strip in the strip histogram grid that has x, y and z dimensions that encompass the spatial coordinate information of the respective assigned sensed data point;
- determining a height $S^H$=maximum z for each strip in the strip histogram grid and storing the height $S^H$ for each strip in computer readable memory; and
- marking a respective strip in the strip histogram grid as a potential power line strip if there are a threshold number of unpopulated cells below the height $S^H$ for the respective strip and the height $S^H$ for the respective strip is greater than a height threshold;
- wherein each strip is divided into a plurality of cells, each cell having a dimension of dx, dy, and dz.

17. The method of claim 16 wherein:
dx, dy and dz are each equal to 32 cm;
the threshold number of unpopulated cells is 4; and
the height threshold is 4 meters.

18. The method of claim 16 further comprising:
- forming a 3D image $I_{pl}$ having token strips having a resolution of dx, dy equal to strips in the strip histogram grid in the x and y dimensions, and token strip heights in the Z dimension set equal to the height $S^H$ for each respective strip in the strip histogram grid marked as a potential power line;
- identifying lines of token strips having height $S^H$ greater than zero in the 3D image $I_{pl}$;
- removing from the 3D image $I_{pl}$ any lines of token strips having a length less than a length threshold; and
- labeling any strip in the strip histogram grid that corresponds to a token strip in the 3D image $I_{pl}$ as a power line strip.

19. The method of claim 18 wherein:
dx and dy are each equal to 32 cm; and
the length threshold is 20.

20. The method of claim 18 wherein identifying lines of token strips comprises:
using a Hough transform.

21. A method of recognizing geometrically salient objects from sensed data points collected in a 3D environment comprising:
- sensing the 3D environment using a sensor that collects a plurality of sensed data points from the 3D environment, each sensed data point having spatial coordinate information in three dimensions x, y and z;
- populating a strip histogram grid having a plurality of strips, each strip having a z, an dx dimension and a dy dimension, wherein dx is a portion of an x dimension of the strip histogram grid and dy is a portion of a y dimension of the strip histogram grid, by assigning each sensed data point to a strip in the strip histogram grid that has x, y and z dimensions that encompass the spatial coordinate information of the respective assigned sensed data point;

determining for each strip a longest array of consecutively populated cells from a local ground plane estimate for the strip to compute a bottom-up height $S^C$, wherein each strip is divided into a plurality of cells, each cell having a dimension of dx, dy, and dz; and labeling a respective strip as a potential post if the bottom-up height $S^C$ for the respective strip is less than or equal to a height threshold, the cells for the respective strip are unpopulated for a distance threshold above the bottom-up height $S^C$, and the cells up to the bottom-up height $S^C$ for the respective strip are populated with at least a population threshold number of sensed data points.

22. The method of claim 21 wherein:
the height threshold is 1.5 meters;
the distance threshold is 1.5 meters; and
the population threshold number is 40.

23. The method of claim 21 further comprising:
merging adjacent potential post strips into a segmented post region if the adjacent potential post strips is less than a merge threshold number.

24. The method of claim 23 wherein:
dx, dy and dz are each equal to 32 cm; and
the merge threshold number is 4.

* * * * *